(12) United States Patent
Tonezzer et al.

(10) Patent No.: US 7,201,199 B2
(45) Date of Patent: Apr. 10, 2007

(54) TIRE WITH BEAD CORE WITH HEXAGONAL SECTION

(75) Inventors: Franco Tonezzer, Monza (IT); Piero Losi, Carugate (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/240,410

(22) PCT Filed: Jan. 22, 2001

(86) PCT No.: PCT/EP01/00642

§ 371 (c)(1),
(2), (4) Date: Oct. 1, 2002

(87) PCT Pub. No.: WO01/54929

PCT Pub. Date: Aug. 2, 2001

(65) Prior Publication Data

US 2003/0106627 A1    Jun. 12, 2003

Related U.S. Application Data

(60) Provisional application No. 60/185,709, filed on Feb. 29, 2000.

(30) Foreign Application Priority Data

Jan. 27, 2000    (EP) .................................. 00101709

(51) Int. Cl.
*B60C 15/00* (2006.01)
*B60C 15/04* (2006.01)

(52) U.S. Cl. .................. 152/539; 152/540; 245/1.5

(58) Field of Classification Search ........... 152/539, 152/540; 245/1.5
See application file for complete search history.

(56) References Cited

U.S. PATENT DOCUMENTS

| 1,437,013 | A | 11/1922 | Pratt |
| 4,135,565 | A | 1/1979 | van der Burg |
| 4,216,814 | A | 8/1980 | Grosch et al. |

(Continued)

FOREIGN PATENT DOCUMENTS

| EP | 0321730 | * | 6/1989 |
| EP | 0414892 | B1 | 3/1991 |
| EP | 0938985 | A1 | 9/1999 |

(Continued)

OTHER PUBLICATIONS

Machine translation of Nakatani (JP 06-032124).*

*Primary Examiner*—Justin R. Fischer
(74) *Attorney, Agent, or Firm*—Finnegan, Henderson, Farabow, Garrett & Dunner, L.L.P.

(57) ABSTRACT

A tire for a vehicle wheel includes a carcass, a tread band radially external to the carcass, and a pair of axially distanced sidewalls. The carcass includes at least one carcass ply including ends associated with bead cores. Each bead core is incorporated in a respective bead and each bead includes a bead filler. Each sidewall is disposed, in a radial direction, between the tread band and a respective bead and is disposed in an axially outermost position. Each bead core includes a plurality of windings of a single wire. The plurality of windings is axially arranged side-by-side in a plurality of radially superposed layers, defines a transverse hexagonal section symmetrical with respect to an axis substantially parallel to the radial direction, and includes radially innermost and radially outermost layers. An axial width of the radially innermost layer is greater than an axial width of the radially outermost layer.

27 Claims, 4 Drawing Sheets

U.S. PATENT DOCUMENTS

| | | | |
|---|---|---|---|
| 4,407,346 A * | 10/1983 | Bandel et al. | 152/209.5 |
| 5,042,546 A | 8/1991 | Forney et al. | |
| 5,058,649 A | 10/1991 | Hoang et al. | |
| 5,226,987 A | 7/1993 | Matsumoto et al. | |
| 5,435,369 A * | 7/1995 | Yap et al. | 152/454 |
| 5,513,686 A * | 5/1996 | Diernaz | 152/540 |
| 5,524,688 A | 6/1996 | Trares et al. | |
| 5,616,195 A * | 4/1997 | Marquet et al. | 152/209.14 |
| 5,711,830 A * | 1/1998 | Neddenriep et al. | 152/540 |
| 6,345,657 B1 * | 2/2002 | Kato | 152/540 |
| 6,491,077 B1 | 12/2002 | Lopez et al. | |

FOREIGN PATENT DOCUMENTS

| | | | |
|---|---|---|---|
| FR | 2778367 A1 | | 11/1999 |
| GB | 1438441 | | 6/1976 |
| JP | 02-296509 A | | 12/1990 |
| JP | 5-193313 | * | 8/1993 |
| JP | 06-032124 A | | 2/1994 |
| JP | 10-53011 | * | 2/1998 |

* cited by examiner

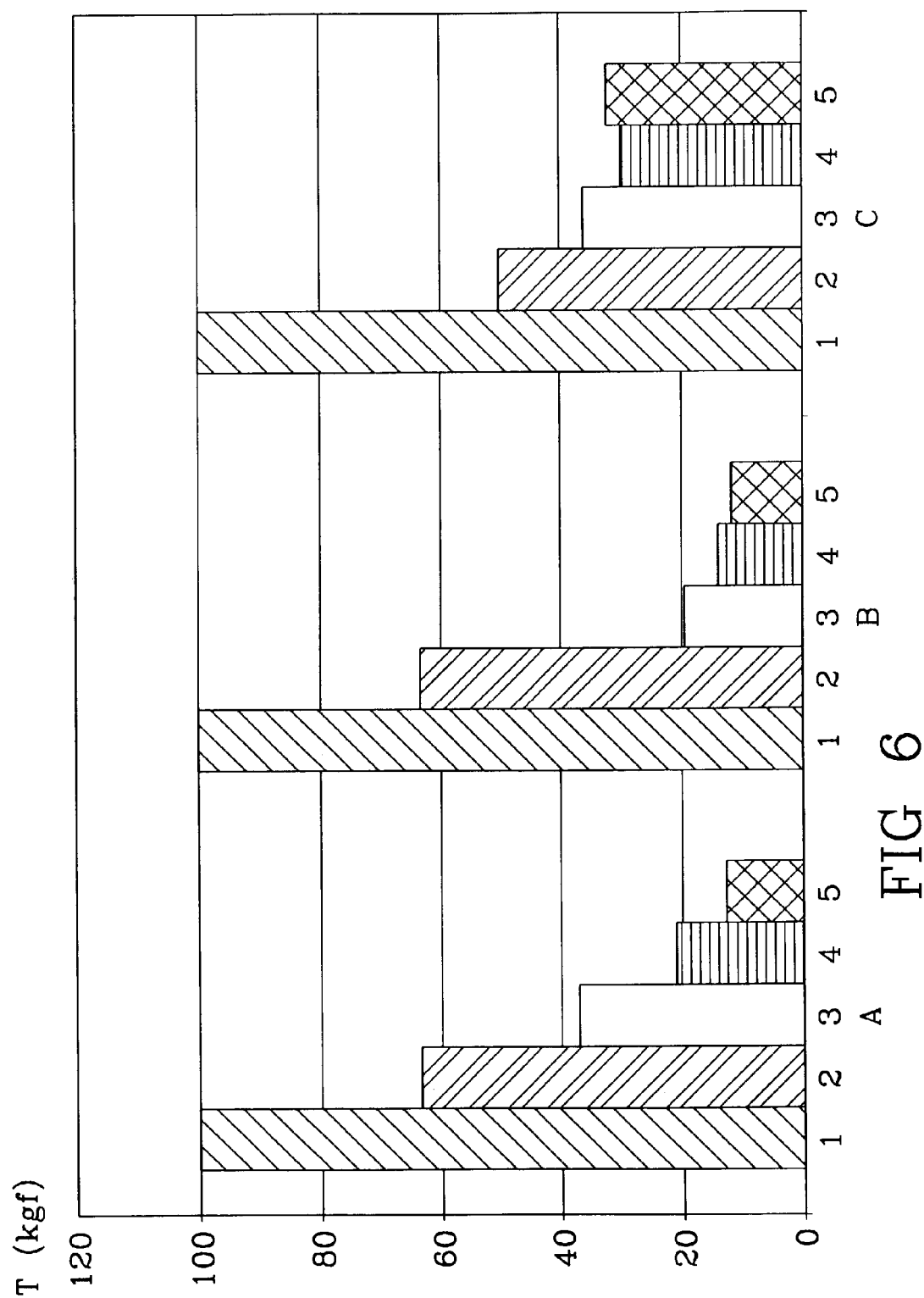

TIRE WITH BEAD CORE WITH HEXAGONAL SECTION

CROSS-REFERENCE TO RELATED APPLICATIONS

This application is a national-phase entry under 35 U.S.C. § 371 from International Application No. PCT/EP01/00642, filed Jan. 22, 2001, in the European Patent Office; additionally, Applicants claim the right of priority under 35 U.S.C. § 119(a)-(d) based on patent application No. 00101709.4, filed Jan. 27, 2000, in the European Patent Office; further, Applicants claim the benefit under 35 U.S.C. § 119(e) based on provisional application No. 60/185,709, filed Feb. 29, 2000, in the U.S. Patent and Trademark Office; the contents of all of which are relied upon and incorporated herein by reference.

BACKGROUND OF THE INVENTION

1. Field of the Invention

This invention refers to a tyre for vehicle wheels and a bead core included in this tyre. More in particularly, the invention refers to a tyre for high or very high performance comprising a single-wire bead core with a hexagonal section.

2. Description of the Related Art

A tyre, in general, comprises a carcass formed by at least one carcass ply shaped in a toric form, the ends of which are anchored around substantially inextensible annular elements, called bead cores, a tread and a belt structure located between the carcass and the tread. The portion of tyre which comprises the bead core is known as a bead and its function is to anchor the tyre on its respective rim. In a traditional structure, the bead usually comprises an appropriate rubber fillet with a substantially triangular section, known as bead filler.

Several types of bead cores and different bead structures are known in the state of the art.

A bead core of a known type has a transverse regular quadrangular section. Here, and in the description which follows, "transverse section" is intended as a section made by means of a plane containing the axis of rotation of the tyre. A regular quadrangular bead core can be formed, for example, starting from a rubber-coated strip, comprising five wires, substantially directed parallel to the axis of the strip itself. Here, and in the description which follows, the term "wire" is intended as a metal wire or a metal cord. The bead core is formed by winding the rubber-coated strip in a spiral, in such a way as to form five layers superimposed in a radial direction, each composed of five windings (or turns). This configuration is referred to as "5×5".

Here, and in the description which follows, "radial direction" is intended as a direction perpendicular to the axis of rotation of the tyre.

An example of a bead core with a regular quadrangular section is described in the patent GB 1,438,441, in the name of the same Applicant. Bead cores with a regular quadrangular section are currently used in the Applicant's tyres for high or very high performance.

The Applicant has discovered that in a bead core with a regular transverse quadrangular section, the distribution of the stress forces in the windings composing the various constructive layers of the bead core is not optimised. In particular, as will be shown better in the detailed description which follows, by means of a simulation of assembly of the tyre on a rim, the Applicant found that in the bead core with a regular quadrangular section, the stress to which the windings are subjected drops rapidly and progressively in the layers radially external to the first. This distribution of the stress values is not optimal. In fact, as the number of windings is the same in all the layers in the bead core with a regular quadrangular section, there is a waste of material (due to the high number of windings) in the radially outermost portion where, instead, the stress value is found to be very low.

The Applicant therefore tackled the technical problem of obtaining a bead core with a better distribution of the forces of stress in the windings among the various layers.

At the same time, in the tyre's working conditions, and at high speeds in particular, the bead core should have guaranteed excellent features of compactness and indeformability of the section, as well as steady support of the bead on the corresponding seat of the rim.

The Applicant perceived that the problem of the unbalancing of the stresses in the windings of the bead core could be solved by modifying the section of the bead core itself, reducing the number of windings of the radially outermost layers of the bead core.

Bead cores with sections other than a quadrangular one are known in the state of the art.

For example, a bead core is known which is formed starting from a single rubber-coated wire, with a regular transverse hexagonal section. Here, and in the description which follows, "hexagonal section" is intended as a section of which the profile can be represented by means of a polygon with six sides. The hexagonal section is regular, this intending to mean that it is symmetrical both with respect to a radial direction and with respect to an axial direction. Here, and in the description which follows, axial direction is intended as a direction parallel to the axis of rotation of the tyre. For example, a regular hexagonal bead core can be formed by 19 windings arranged in a 3-4-5-4-3 configuration. This set of numbers indicates that the single wire has been wound in such a way that it first of all constitutes three turns arranged axially side by side to form the first layer, then four turns arranged axially side by side to form the second layer, radially superimposed on those of the first layer, then five turns arranged axially side by side to form the third layer, radially superimposed on those of the second layer, then four turns again arranged axially side by side to form the fourth layer, radially superimposed on those of the third layer, and then three turns again arranged axially side by side to form the fifth layer, radially superimposed on those of the fourth layer. The layers have been numbered in accordance with their position in the radial direction: here, and in the description which follows, the first layer is intended as the radially innermost layer. Furthermore, below in the description, the notation "single-wire bead core" will be used to indicate a bead core formed by a plurality of windings of a single wire.

Examples of single-wire bead cores with a hexagonal section are given in the patent JP 02-296509 in the name of Toyo Tire & Rubber.

Other patents describe single-wire bead cores with different sections. Among these, the patents U.S. Pat. No. 5,058,649 and U.S. Pat. No. 5,524,688 in the name of Goodyear Tire & Rubber describe a single-wire bead core with a pentagonal section incorporated in a bead not comprising the above-mentioned bead filler.

In an alternative to the single-wire bead cores, bead cores described as "spiral" are known in the state of the art. This type of bead core is made up of a central core, formed, for example, starting from a single rubber-coated wire, around which other wires are wound in spirals in such a way as to form an external sheath. An example of a spiral bead core is given in the patent U.S. Pat. No. 1,437,013 in the name of International Bead Wire Company, which describes a bead core with a central core having a triangular section formed by a single wire around which a plurality of spiral windings of another wire are wound, forming the external sheath.

After being formed in this way, the bead core is extended radially in such a way as to give the external sheath, which initially had a circular section, a section determined by the section of the central triangular core, or a hexagonal section.

Patent '013 states that the transverse section of the bead core obtained in this way is particularly suitable for tyres for vehicles for heavy-goods transport.

SUMMARY OF THE INVENTION.

The Applicant has discovered that even in a single-wire bead core with a regular hexagonal section, the distribution of the stresses is not optimized and that the use of this bead core in a tyre for high performance does not provide any improvement compared with the use of a bead core with a regular quadrangular section.

The Applicant found that it is possible to obtain an optimised distribution of the stresses with a single-wire bead core having a non-regular hexagonal section, symmetrical with respect to a radial direction, and asymmetrical with respect to an axial direction, in which the radially innermost layer is formed by a greater number of windings compared with the radially outermost layer. The tyre comprising this bead core has excellent features of compactness and indeformability of the section, as well as steady support for the bead on the corresponding seat on the rim. As well as the abovementioned features, this bead core makes it possible to obtain a significant weight reduction, as well as the elimination of a series of constraints in the design of the bead region of the tyre, without moreover having to take recourse to substantial modifications with respect to the traditional structure of the bead comprising the abovementioned bead filler.

In a first aspect, the invention concerns a tyre for vehicle wheels comprising: a carcass, comprising at least one carcass ply, with the ends associated with a pair of bead cores, each of said bead cores being incorporated in a respective bead comprising a bead filler; a tread band radially external to said carcass; a pair of axially distanced sidewalls, each arranged between the respective bead and said tread band in a radial direction and in axially outermost position. Each bead core comprises a plurality of windings of a single wire, arranged axially side by side in a plurality of layers radially superimposed in such a way as to define a transverse hexagonal section with an axial width of the radially innermost layer of said plurality of layers greater than the axial width of the radially outermost layer of said plurality of layers.

Typically, the tyre also comprises a belt structure between said carcass and said tread band, comprising at least two belt strips radially superimposed on one another and comprising reinforcement cords parallel to each other in each strip and crossed with respect to the adjacent strip.

The tyre can also comprise one or more layers with reinforcement cords at 0°.

In a preferred embodiment, the tyre also comprises an underlayer placed between said belt structure and said tread band. The thickness of the underlayer can be between 1 and 3 mm.

Advantageously, the transverse section of bead filler has a profile with a base adapted to the radially external portion of the profile of the section of the bead core.

More particularly, the profile of the section of the filler comprises two axially separated protrusions which extend towards the axis of rotation of the tyre in the radial direction.

The radially outermost layer of the plurality of layers forming the bead core has a number of windings greater than or equal to two.

Preferably, the layer of the bead core with the maximum axial width has a number of windings less than or equal to ten. Even more preferably, this layer has a number of windings less than or equal to six.

In one example, the layers making up the bead core are arranged in a 4-5-4-3-2 configuration. In another example, the layers making up the bead core are arranged in a 5-6-5-4-3 configuration. In another example, the layers making up the bead core are arranged in a 5-6-5-4-3-2 configuration.

BRIEF DESCRIPTION OF THE DRAWINGS

Further characteristics and advantages will become more clearly evident in the light of the detailed description of an example of a tyre and of bead core in accordance with the present invention. This description, given here below, refers to attached drawings supplied for exemplary and non-limiting purposes only, in which:

FIG. 6 compares the results of the simulations made respectively on the bead cores in FIG. 3(A), FIG. 4(B) and FIG. 5(C).

DETAILED DESCRIPTION OF THE EXEMPLARY EMBODIMENTS

Figure 1:
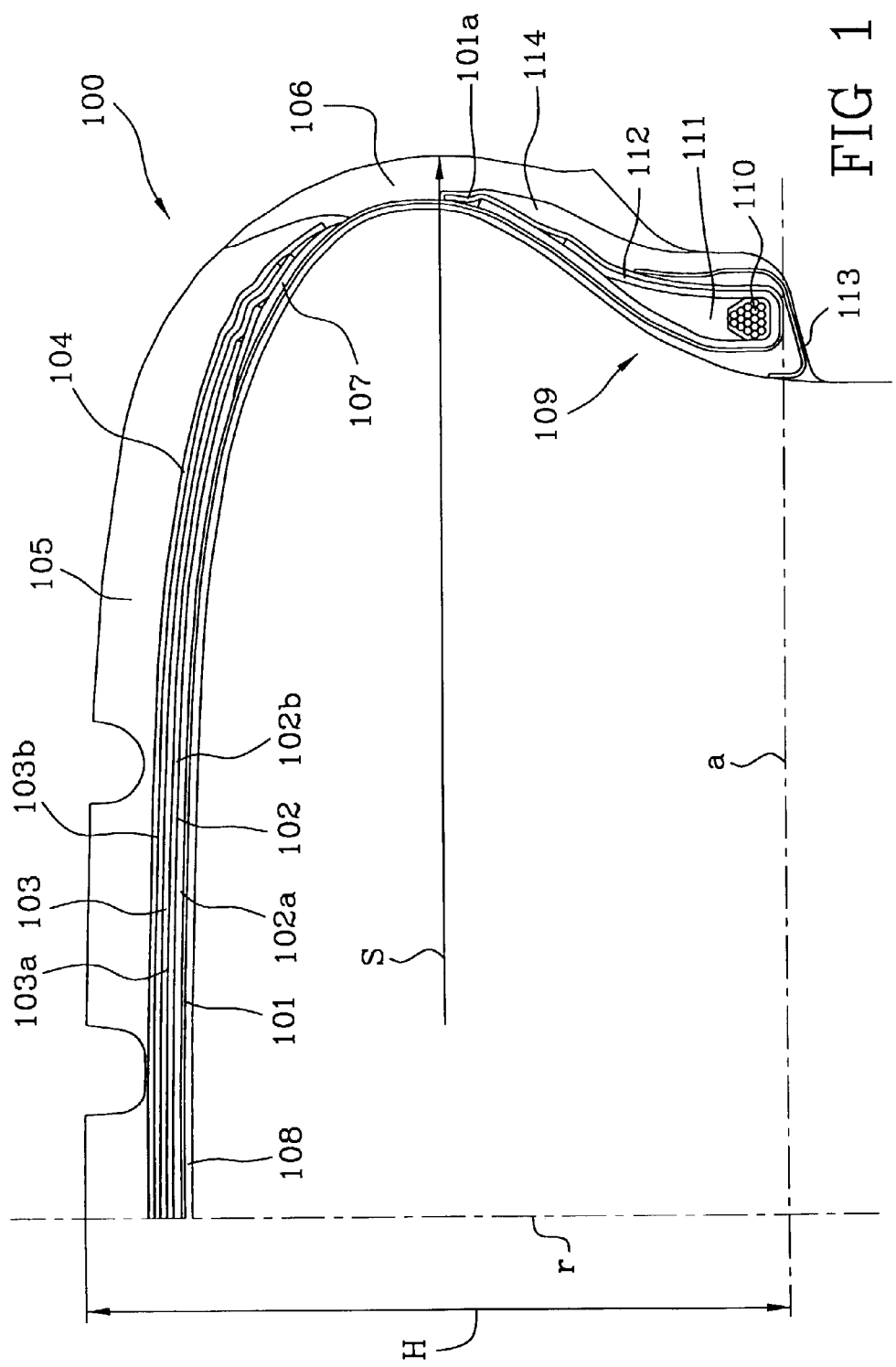
FIG. 1 shows a transverse section of a tyre according to the present invention.

A transverse section of an example of a tyre 100 in accordance with the invention is shown in FIG. 1. The "a" indicates an axial direction while the "r" indicates a radial one. For greater descriptive clarity, the section is represented only partially as it is symmetrical with respect to the radial direction "r". The example in FIG. 1 shows a class ZR, size 265/35 tyre: this means that the chord S of the transverse section of the tyre 100 is 265 mm and the ratio H/S between the height H and the chord S of the transverse section of the tyre 100 is 0.35. Preferably, this ratio, H/S, is less than 0.65 in the tyres according to the invention.

It should be noted that the ZR class identifies very high performance tyres, with maximum achievable speeds in excess of 270 km/h. The invention applies to all kinds of tyres, but expresses its advantageous effects to an increasing extent as the tyre class increases.

The tyre 100 comprises a carcass formed by at least one carcass ply 101, the ends 101a of which are associated with a pair of bead cores 110, distanced axially from each other, each of which is incorporated in a respective bead 109, placed in a radially internal position. The carcass is preferably radial, that is, it incorporates reinforcing cords arranged substantially in a perpendicular direction with respect to a circumferential direction, that is, lying on the plane of the transverse section.

The tyre also comprises a tread band 105, located in a position radially external to the carcass, and a pair of axially distanced sidewalls 106, each arranged between the respective bead 109 and the tread band 105 in a radial direction, in axially outermost position.

In tyres with a radial carcass, a belt structure 102 is provided, comprising at least two belt strips, between the carcass and the tread band 105. In the example in FIG. 1, the belt structure 102 comprises two radially superimposed belt strips 102*a* and 102*b*. These belt strips 102*a* and 102*b* incorporate reinforcement cords, typically metal cords, parallel to each other in each strip and crossed with respect to the adjacent strip, arranged in such a way as to form a predetermined angle with respect to a circumferential direction.

One or more reinforcement layers 103 can be placed between the belt structure 102 and the tread band 105 at 0°, meaning by this that these layers incorporate reinforcement cords, typically textile cords, arranged at a very small angle (a few degrees) with respect to a circumferential direction. In the example in FIG. 1, the tyre comprises two reinforcement layers 103*a* and 103*b* at 0°.

Furthermore, an underlayer 104 can be placed between the belt structure 102 and the tread band 105, to form a structure known as "cap and base". Typically, the thickness of the underlayer is between 1 and 3 mm. Preferably, this thickness is between 1 and 1.5 mm.

The use of one of more belt end fillets 107 can be envisaged at the ends of the belt strips 102*a* and 102*b*.

In tubeless tyres, a layer of rubber coating 108, known as a liner, can also be provided in a radially internal position with respect to the carcass to provide optimum impermeability to air.

The tyre 100 is mounted on a conventional rim, not shown in FIG. 1, to form a tyre wheel.

Figure 2:
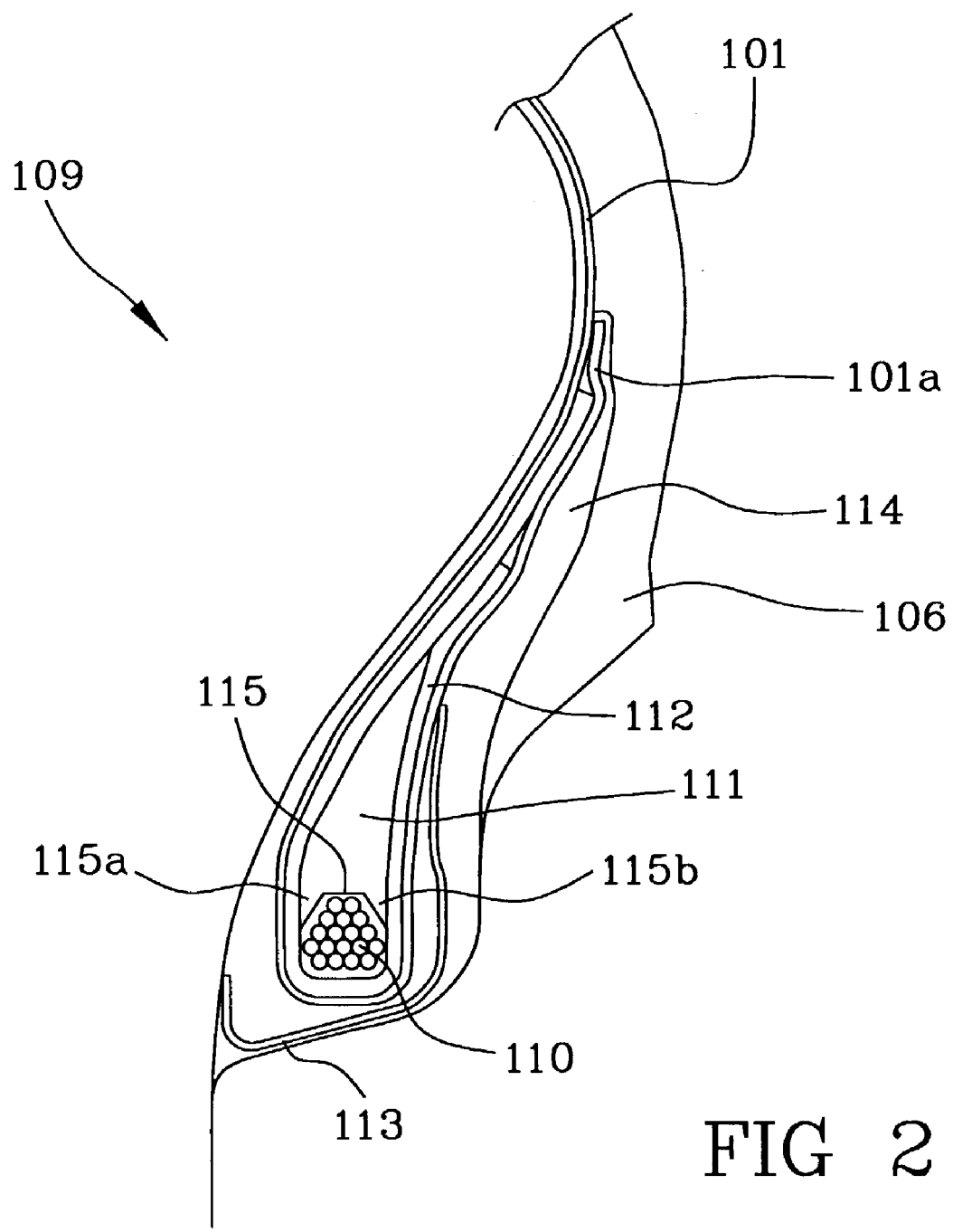
FIG. 2 shows an enlargement of the bead region of the tyre in FIG. 1.

FIG. 2 shows an enlargement of the section in FIG. 1 in the region of the bead 109, illustrating its structure in a more detailed manner.

The bead 109 comprises a bead core 110 and bead filler 111, located in a radially external position with respect to the bead core 110.

The bead core 110 is a single-wire bead core and has a transverse section with a non-regular geometrical hexagonal form. Although the exemplary bead core 110 shown in FIGS. 1 and 2 comprises three axes of symmetry, it is symmetrical with respect to a radial direction of the tyre but not an axial direction of the tyre. In the example shown in FIGS. 1 and 2, it is formed by 18 windings of a rubber-coated wire. The bead core 110 is arranged in such a way that one of the axes of symmetry of its transverse section coincides with the radial direction. This means that the various layers which form the bead core are arranged substantially in an axial direction, superimposed radially with respect to one another. The structure and the geometrical form of the section of the bead core 110 will be illustrated in detail below, with reference to FIG. 5.

As it can be seen in FIG. 2, the section of the bead filler 111 has a substantially triangular profile, the base 115 of which is advantageously adapted to the radially external portion of the profile of the section of the bead core 110. In particular, the profile of the section of the bead filler 111 advantageously has two axially separated protrusions 115*a* and 115*b*, extending towards the axis of rotation of the tyre in a radial direction ("dovetail" profile).

The end 101*a* of the carcass ply/plies 101 forms a turn-up around the bead core 110 and the bead filler 111. A chafer 112 formed by a rubber-coated strip comprising textile cords can be added around the bead core 110 and the bead filler 111.

An abrasion-proof fillet 114 is usually placed in an axially external position with respect to the carcass turn-up in order to protect the carcass from possible lacerations caused by the continuous rubbing of the bead 109 on the rim. The radially internal part of the sidewall 106 then encloses the bead 109 in an axially external position. Another rubber-coated sheet 113, comprising typically textile cords, can be inserted into the bead 109 as further reinforcement.

Figure 5:
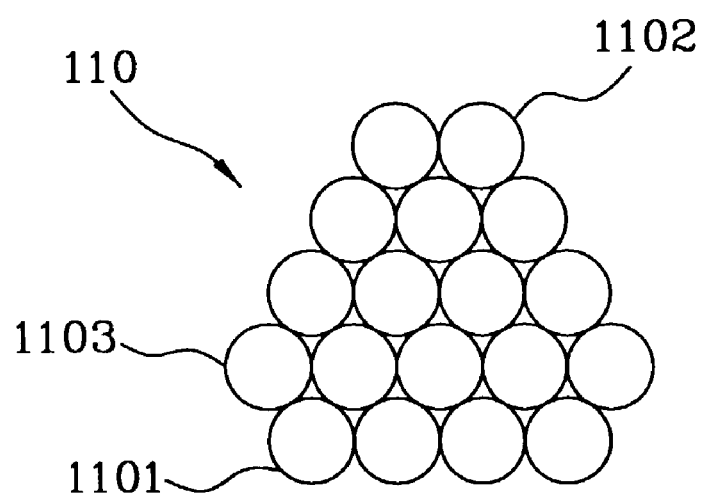
FIG. 5 shows a transverse section of an example of bead core in accordance with the present invention.

An example of bead core used in this invention is shown in section in FIG. 5, formed by 18 windings of a single rubber-coated wire, arranged in a 4-5-4-3-2 configuration. This series of numbers indicates that the single wire has been wound in such a way as to first of all form four turns arranged axially side by side to form the first layer, then five turns arranged axially side by side to form the second layer, superimposed radially on those of the first layer, then four turns arranged axially side by side to form the third layer, superimposed radially on those of the second layer, then three turns arranged axially side by side to form the fourth layer, superimposed radially on those of the third layer, and then two turns arranged axially side by side to form the fifth layer, superimposed radially on those of the fourth layer.

The section of the bead core 110 is non-regular and hexagonal, symmetrical with respect to a radial direction and non-symmetrical with respect to an axial direction. The hexagonal section has a larger base side and a smaller base side. The larger base side is formed by the set of windings which make up the first layer 1101, that is, the radially innermost layer: there are four windings in the example shown in FIG. 5. The smaller base side is formed by the set of windings which make up the fifth layer 1102, that is, the radially outermost layer: there are two windings in the example shown in FIG. 5.

The number of windings which make up the radially outermost layer 1102 is smaller than the number of windings which make up the radially innermost layer 1101. In other words, the axial width of the radially outermost layer 1102 is smaller that the axial width of the radially innermost layer 1101.

The number of windings in the radially outermost layer 1102 is no less than two. A configuration with a single winding for making up the radially outermost layer 1102 would give the bead core a pentagonal or "drop-shaped" section, with the "tip" turned towards the bead filler. This "tip" is undesirable as it can trigger the breaking of the bead filler itself. During the life of the tyre, in fact, the bead filler is subjected to continuous stresses transmitted by the carcass. These stresses can be the cause of sliding and/or oscillations of the bead filler against the radially outermost layers of the bead core: a radially outermost "tip", caused by a pentagonal section of the bead core would therefore represent an extremely critical factor.

The hexagonal section of the bead core 110 has its maximum axial width in correspondence with a layer 1103 external to the radially innermost layer 1101. This layer 1103 has five windings in the example in FIG. 5. The layer 1103 with the maximum axial width is in the radially innermost part, subdividing the hexagonal section of the bead core 110 radially into two parts having the same height. This makes it possible to get very stable support for the bead on the corresponding seat in the rim, with a notable improvement in the dirving behaviour characteristics, in particular at the limit of the adherence conditions.

Preferably, the number of windings of the layer 1103 with the maximum axial width, or the maximum number of windings per layer of the bead core 110, is no greater than ten. Even more preferably, this maximum number of windings per layer is no greater than six. The layer 1101, radially internal to the layer 1103 with the maximum axial width, having a smaller axial width with respect to said maximum axial width, advantageously facilitates the wrapping of the carcass around the bead core itself, in such a way as not to create "tips" turned towards the carcass itself.

The bead core 110 can be produced using methods and machines which are conventional in the technology for producing single-wire bead cores, for example winding the single rubber-coated metal wire around a rigid spindle the number of times necessary to produce the desired section. The wire used is preferably a steel wire with a modulus of elasticity between 195,000 MPa and 215,000 Mpa. The section of the wire is preferably circular, with a diameter between 0.8 mm and 1.4 mm, preferably between 0.96 mm and 1.27 mm.

Other configurations of single-wire bead core with a non-regular hexagonal transverse section with the radially innermost layer having an axial width greater than the axial width of the radially outermost layer can be made.

The minimum configuration is a 3-4-3-2 configuration with 12 windings. Other particularly preferred configurations are: 5-6-5-4-3 with 23 windings and 5-6-5-4-3-2 with 25 windings.

Figure 3:
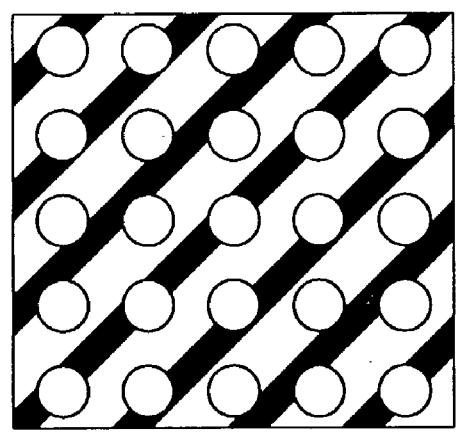
FIG. 3 shows a transverse section of a an example of bead core according to known technology (regular quadrangular), as previously described.
Figure 4:
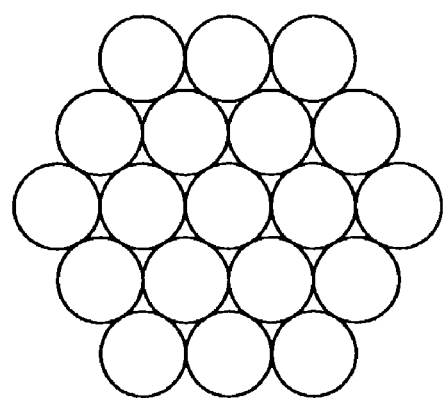
FIG. 4 shows a transverse section of a second example of bead core according to known technology (regular hexagonal), as previously described.

To check the distribution of the stress forces in the windings forming the different layers of the bead core 110 in FIG. 5 and compare it with the same distribution in the known bead cores in FIGS. 3 and 4, the Applicant simulated an assembly test of a tyre on a rim, by means of a finite-element model.

In practice, the application of the same stress to every winding forming the radially innermost layer of the bead core was simulated and the corresponding stress values in the windings of the radially outermost layers were obtained from the model. A stress force applied to the wires of the bead core translates into an elongation of the wires themselves; in particular, the force applied in the test corresponded to that which provokes a deformation of the bead core to such an extent as to allow the bead core itself to spread over the seat in a rim.

The stress applied to each winding making up the radially innermost layer of the bead core was 100 kgf. The simulation was carried out on a 5×5 bead core, as illustrated in FIG. 3, on a single-wire hexagonal regular bead core with a 3-4-5-4-3 configuration with 19 windings, as illustrated in FIG. 4, and on a single-wire hexagonal non-regular bead core with a 4-5-4-3-2 configuration with 18 windings, as illustrated in FIG. 5. The three bead cores were formed starting from wires having the same diameter and same modulus of elasticity, rubber coated with mixtures having identical characteristics.

It should be noted that it is possible to directly compare the results obtained with each other, as the three bead cores have the same dimensions, determined by the five layers radially superimposed and by a maximum number of five windings per layer.

The overall results obtained are shown in FIG. 6 in which: the stress values obtained in the windings in the 5×5 bead core in FIG. 3 are grouped in A; the stress values obtained in the windings in the single-wire hexagonal regular bead core in FIG. 4 are grouped in B; the stress values obtained in the windings in the bead core of the invention in FIG. 5 are grouped in C.

For each grouping A, B and C, the different bars represent the stress value in each winding belonging to the different radially superimposed layers: the layers have been numbered from 1 to 5 with the usual notation, where the layer indicated with 1 is the radially innermost one and the layer indicated by 5 is the radially outermost one.

The stress value T obtained for each winding is shown on the ordinate. We analyse the groupings one by one.

Grouping A (quadrangular regular 5×5): with a stress of 100 kgf applied to every winding of layer 1, it can be seen that the windings of the radially external layers are subjected to progressively decreasing stresses. In the 5×5 bead core, the radially external layers (4, 5) are therefore made up of wires which are subjected to low stress during the use of the tyre, as during the phases of fitting and removing the tyre from the rim. As the number of windings in layers 4 and 5 is the same as the number of windings in the radially innermost layers 1, 2 and 3, there is an excess of material in a region subjected to low stress.

Grouping B (hexagonal regular 3-4-5-4-3 with 19 windings): with a stress of 100 kgf applied to every winding of layer 1, it can be seen that the windings of the radially external layers are subjected to progressively decreasing stresses to an even more accentuated degree than in the previous case. Though the single-wire hexagonal regular bead core with 19 windings has a lower weight than the weight of the 5×5 bead core with a regular quadrangular section, it does not solve the problem of the optimisation of the distribution of the stresses and indeed makes it worse.

Grouping C (hexagonal non-regular 4-5-4-3-2 with 18 windings) : with a stress of 100 kgf applied to every winding of layer 1, it can be seen that the windings making up the layers 2 to 5 are subjected to stresses which are much closer together. In particular, the windings of layer 3 are subjected to a stress which is substantially identical to that obtained in the corresponding layer 3 of the regular quadrangular bead core, as well as substantially double that obtained in the corresponding layer 3 of the hexagonal regular bead core. The windings of the radially outermost layers, 4 and 5, are subjected to higher stresses than those obtained in the corresponding layers of both the bead cores being compared, with an evident improvement especially in the layer 5 windings where the value is substantially treble compared with the corresponding ones. The structure of the bead core of the invention is therefore more optimised, with a better distribution of the stress forces between the windings and with a considerable weight reduction (18 windings compared with 25, about 33%) compared with the 5×5 regular quadrangular bead core. It should be noted that a weight reduction is also obtained compared with the regular hexagonal bead core (18 windings compared with 19).

A series of tests was then carried out to validate the finite-element analysis, making three sets of tyres whose only difference was the kind of bead core used and testing them on the road and track with dry asphalt. These were tyres named PZERO, by the Applicant itself, size 235/45, mounted and inflated on rims with 17" diameter and an axial width of 8", with an inflation pressure of 2.3 bar. The first set of tyres was made by putting in a single-wire bead core having a regular hexagonal section and 19 windings with a 3-4-5-4-3 configuration (comparison); the second set was made by putting in a single-wire bead core having a non-regular hexagonal section and 18 windings with a 4-5-4-3-2 configuration (invention); the third set was made by putting in a 5P×5 bead core having a regular quadrangular section (comparison).

The test car was a BMW M3. The temperature at the time of the test was 24° C.

Three different types of tests were carried out: rectilinear travel, behaviour driven at normal speed (soft handling), and behaviour at the limit of adherence (hard handling).

As far as the rectilinear travel tests were concerned, the tester assessed: centring on a flat surface, that is the capacity of the tyre to maintain the straight line on a surface without great roughness without the need for frequent steering corrections; the steering stiffness at zero, that is the load felt at the steering wheel for small steering angles.

As far as the soft handling tests were concerned, the tester assessed: emptiness in the centre, that is the delay and the degree of response of the vehicle to small steering angles; the promptness of response to the steering coming into a bend; the progressiveness of response to the steering travelling in a bend; centring in a bend, that is the tyre's capacity to keep the vehicle on a bend with a constant radius without continuous steering corrections; realignment, that is the capacity of the tyre to allow the vehicle to return to a rectilinear trajectory at the exit of a bend with contained and dampened transverse oscillations.

As far as the hard handling tests were concerned, the tester assessed: the force on the steering wheel when turning violently; the promptness of insertion, that is the behaviour of the tyre in transition at the entrance of the bend taken at the limit speed; the balancing, that is the degree of oversteering or under-steering of the vehicle; the yield, that is the tyre's capacity to absorb a strong fast transfer of the load as a consequence of a sudden change of lane without excessive deformation, and therefore without compromising vehicle stability and controllability; release in a bend, that is the tyre's capacity to dampen the effects of instability resulting from the sudden release of the accelerator during a bend taken at the limit speed; controllability, that is the tyre's capacity to maintain and/or return the vehicle to the trajectory after the loss of adherence.

Table 1 sums up the tester's score sheet for the tyre's controllability. It should be noted that the scale of values runs from a minimum of 4 to a maximum of 9.

As it can be seen, the set of tyres with the bead core according to the invention has notably better characteristics compared with the set of tyres with bead core for comparison with the regular hexagonal section. This confirms the greater stability of support on the corresponding seat in the rim, in running conditions, of the bead comprising a non-regular hexagonal bead core compared with what can be obtained with a bead core with a regular hexagonal section.

Furthermore, there is an improvement compared with the set of tyres with bead core with a regular quadrangular section in the items concerning rectilinear travel and soft handling. As far as behaviour at the limit of adherence is concerned, the assessment was substantially identical for the two sets of tyres.

TABLE 1

|  |  | Single-wire hexagonal regular (comparison) | Single-wire hexagonal non-regular (invention) | Quandrangular regular (comparison) |
| --- | --- | --- | --- | --- |
| Rectilinear travel | Centring | 7 | 8 | 7 |
|  | Steering stiffness at zero | 7 | 8 | 8 |

TABLE 1-continued

|  |  | Single-wire hexagonal regular (comparison) | Single-wire hexagonal non-regular (invention) | Quandrangular regular (comparison) |
| --- | --- | --- | --- | --- |
| Steering behaviour (Soft handling) | Emptiness at the centre | 7 | 8 | 8 |
|  | Promptness | 7 | 8 | 8 |
|  | Progressiveness | 7 | 7 | 7 |
|  | Centring in bend | 7 | 8 | 7 |
|  | Realignment | 7 | 8 | 7 |
| Behaviour at limit (Hard handling) | Force on steering wheel | 7 | 7 | 8 |
|  | Promptness of insertion | 7 | 7 | 7 |
|  | Balancing | 6 | 6 | 6 |
|  | Yield | 6 | 7 | 7 |
|  | Release in bend | 6 | 7 | 7 |
|  | Controllability | 6 | 7 | 7 |

The result of the above tests therefore highlights that as far as behaviour on the road in concerned, the use of a single-wire bead core with a non-regular hexagonal section similar to the one shown in FIG. 5 makes it possible to improve the tyre's behaviour characteristics, without affecting the other structural characteristics of the tyre itself, both compared with a bead core with a regular hexagonal section, and compared with a bead core with a regular quadrangular section.

The improvements compared with a tyre comprising a regular quadrangular bead core have been obtained with considerable further advantages.

First of all, the use of a single-wire bead core allows the problems of uniformity inside the tyre to be considerably reduced. The regular quadrangular bead core presents in fact a fairly extensive overlap region which cannot be eliminated and which is due to the way the bead core is made. As the strip of rubber-coated wires from which the bead core is formed has a given thickness, in the regions close to the ends of the strip itself there is a rise in the thickness of the bead core across its entire axial width, which is the source of a lack of uniformity inside the tyre. With a single-wire bead core, the overlap problem has been substantially eliminated as a whole, to the complete advantage of the uniformity of the tyre.

A further advantage, already highlighted above, comes from the considerable weight reduction. The bead core of the invention makes it possible to obtain better tyre behaviour characteristics with a lower number of windings of metal wire and with a much smaller presence of rubber compared with that used in the bead cores with a regular quadrangular section. For the same tyre and size used, the bead core of the invention with 18 windings and a 4-5-4-3-2 configuration permits a net weight reduction of 33% compared with a quadrangular 5×5 bead core. There is also a reduction in weight compared with the bead core with a regular hexagonal section and 19 windings with a 3-4-5-4-3 configuration, thanks to the lower number of windings of metal wire.

The lesser rubber coating on the bead core of the invention compared with the rubber coating on the bead core with a regular quadrangular section makes it possible to obtain a bead core section which is virtually unchanged along the longitudinal development of the bead core itself in the manufactured and vulcanized tyre. This is because during the vulcanization phase the rubber coating of the bead core tends to arrange itself randomly and not according to the pre-established layers: the smaller quantity of rubber therefore increases the compactness of the bead core and guarantees that its section will be substantially unchanged along the entire longitudinal development.

The particular section selected also makes it possible to gain other advantages in the design of the tyre.

As in the outermost radial layers there is a progressive drop in the number of windings, and therefore in the axial width of the bead core, it is possible to use a bead filler with a transverse section which is slightly modified with respect to the usual triangular section starting from the layer 1103 with the higher axial width and proceeding in a radial direction away from the axis of rotation of the tyre. The bead filler with a dovetail section 111, shown in FIG. 1 and in greater detail in FIG. 2, suitable for perfect support on the transverse section of the bead core with a hexagonal section, is considerably more flexible in the axial direction compared with the traditional bead filler with a triangular section: this makes it possible to obtain an extra degree of freedom during the design phase of the bead region.

A further advantage in the design phase also comes from the reduction of the axial width of the radially innermost layer of the bead core, that is, of the support base of the bead core itself. In fact, for the same tyre and size used, the single-wire bead core with non-regular hexagonal section and 4-5-4-3-2 configuration in fact has a smaller axial width of the radially internal layer compared with a quadrangular 5P×5 bead core (one winding less) and the radially internal part of its section facilitates the turn-up of the carcass ply/plies around the bead core itself. This makes it possible to obtain a carcass turn-up with a lower radius and therefore to obtain an extra degree of freedom during the design phase, of the tyre sidewall for example.

The invention claimed is:

1. A high or very high performance tyre for a vehicle wheel, comprising:
   a carcass;
   a tread band radially external to the carcass;
   a pair of axially distanced sidewalls; and
   wherein the carcass comprises at least one carcass ply,
   wherein the at least one carcass ply comprises ends associated with a pair of bead cores,
   wherein each bead core is incorporated in a respective bead,
   wherein each bead comprises a bead filler,
   wherein each sidewall is disposed, in a radial direction of the tyre, between the tread band and a respective bead,
   wherein each sidewall is disposed in an axially outermost position,
   wherein each bead core comprises a plurality of windings of a single wire,
   wherein the plurality of windings is axially arranged side-by-side in a plurality of radially superposed layers,
   wherein the plurality of windings defines a transverse hexagonal section,
   wherein the transverse hexagonal section is symmetrical with respect to an axis substantially parallel to the radial direction,
   wherein the plurality of windings comprises a radially innermost layer and a radially outermost layer,
   wherein an axial width of the radially innermost layer is greater than an axial width of the radially outermost layer,
   wherein a ratio of a height of a transverse section of the tyre to a chord of the transverse section of the tyre is less than 0.65:1, and
   wherein a number of windings of one of the plurality of radially superimposed layers having a maximum axial width is equal to a total number of the plurality of radially superimposed layers.

2. The tyre of claim 1, further comprising:
   a belt structure between the carcass and the tread band;
   wherein the belt structure comprises at least two belt strips radially superimposed on one another, and
   wherein each belt strip comprises reinforcement cords parallel to each other in each strip and crossed with respect to an adjacent strip.

3. The tyre of claim 2, further comprising:
   at least one reinforcement layer disposed between the tread band and the belt structure;
   wherein cords of the at least one reinforcement layer are substantially at 0° with respect to an equatorial plane of the tyre.

4. The tyre of claim 2, further comprising:
   two reinforcement layers disposed between the tread band and the belt structure;
   wherein cords of the two reinforcement layers are substantially at 0° with respect to an equatorial plane of the tyre.

5. The tyre of claim 2, further comprising:
   an underlayer;
   wherein the underlayer is disposed between the tread band and the belt structure.

6. The tyre of claim 5, wherein a thickness of the underlayer is greater than or equal to 1 mm and less than or equal to 3 mm.

7. The tyre of claim 1, wherein the ratio is less than or equal to 0.45:1.

8. The tyre of claim 1, wherein a transverse section of the bead filler comprises a profile with a base adapted to a radially outermost part of a profile of a respective transverse hexagonal section.

9. The tyre of claim 8, wherein the profile of the transverse section of the bead filler comprises two axially separated protrusions extending, in a radial direction, toward an axis of rotation of the tyre.

10. The tyre of claim 1, wherein the radially outermost layer comprises a number of windings greater than or equal to two.

11. The tyre of claim 1, wherein the number of windings of the layer of the plurality of radially superimposed layers with the maximum axial width is less than or equal to ten.

12. The tyre of claim 1, wherein the number of windings of the layer of the plurality of radially superimposed layers with the maximum axial width is less than or equal to six.

13. The tyre of claim 1, wherein the tyre is capable of achieving speeds in excess of 270 kilometers/hour.

14. The tyre of claim 1, wherein the plurality of radially superposed layers is arranged in a 3-4-3-2 configuration.

15. The tyre of claim 1, wherein the plurality of radially superposed layers is arranged in a 4-5-4-3-2 configuration.

16. The tyre of claim 1, wherein the plurality of radially superposed layers is arranged in a 5-6-5-4-3-2 configuration.

17. The tyre of claim 1, wherein the single wire is a steel wire.

18. The tyre of claim 17, wherein the steel wire comprises a modulus of elasticity greater than or equal to 195,000 MPa and less than or equal to 215,000 MPa.

19. The tyre of claim 1, wherein the single wire comprises a circular cross-section.

20. The tyre of claim 19, wherein the circular cross-section comprises a diameter greater than or equal to 0.8 mm and less than or equal to 1.4 mm.

21. The tyre of claim 19, wherein the circular cross-section comprises a diameter greater than or equal to 0.96 mm and less than or equal to 1.27 mm.

22. A tyre for a vehicle wheel, comprising:
a carcass;
a tread band radially external to the carcass;
a pair of axially distanced sidewalls; and
wherein the carcass comprises at least one carcass ply,
wherein the at least one carcass ply comprises reinforcing cords disposed substantially perpendicular to a circumferential direction of the tyre,
wherein the at least one carcass ply further comprises ends associated with a pair of bead cores,
wherein each bead core is incorporated in a respective bead,
wherein each bead comprises a bead filler,
wherein each sidewall is disposed, in a radial direction of the tyre, between the tread band and a respective bead,
wherein each sidewall is disposed in an axially outermost position,
wherein each bead core comprises a plurality of windings of a single wire,
wherein the plurality of windings is axially arranged side-by-side in a plurality of radially superposed layers,
wherein the plurality of windings defines a transverse hexagonal section,
wherein the transverse hexagonal section is symmetrical with respect to an axis substantially parallel to the radial direction,
wherein the plurality of windings comprises a radially innermost layer and a radially outermost layer,
wherein an axial width of the radially innermost layer is greater than an axial width of the radially outermost layer,
wherein a ratio of a height of a transverse section of the tyre to a chord of the transverse section of the tyre is less than or equal to 0.45:1, and
wherein a number of windings of one of the plurality of radially superimposed layers having a maximum axial width is equal to a total number of the plurality of radially superimposed layers.

23. A four-wheeled-vehicle tyre, comprising:
a carcass;
a tread band radially external to the carcass;
a pair of axially distanced sidewalls; and
wherein the carcass comprises at least one carcass ply,
wherein the at least one carcass ply comprises ends associated with a pair of bead cores,
wherein each bead core is incorporated in a respective bead,
wherein each bead comprises a bead filler,
wherein each sidewall is disposed, in a radial direction of the tyre, between the tread band and a respective bead,
wherein each sidewall is disposed in an axially outermost position,
wherein each bead core comprises a plurality of windings of a single wire,
wherein the plurality of windings is axially arranged side-by-side in a plurality of radially superposed layers,
wherein the plurality of windings defines a transverse hexagonal section,
wherein the transverse hexagonal section is symmetrical with respect to an axis substantially parallel to the radial direction,
wherein the plurality of windings comprises a radially innermost layer and a radially outermost layer,
wherein an axial width of the radially innermost layer is greater than an axial width of the radially outermost layer,
wherein a ratio of a height of a transverse section of the tyre to a chord of the transverse section of the tyre is less than 0.65:1, and
wherein a number of windings of one of the plurality of radially superimposed layers having a maximum axial width is equal to a total number of the plurality of radially superimposed layers.

24. The tyre of claim 23, wherein the tyre is capable of achieving speeds in excess of 270 kilometers/hour.

25. The tyre of claim 1, wherein the ratio of the height of the transverse section of the tyre to the chord of the transverse section of the tyre is less than 0.45:1.

26. The tyre of claim 22, wherein the ratio of the height of the transverse section of the tyre to the chord of the transverse section of the tyre is less than 0.45:1.

27. The tyre of claim 23, wherein the ratio of the height of the transverse section of the tyre to the chord of the transverse section of the tyre is less than 0.45:1.

* * * * *